United States Patent Office 3,269,965
Patented August 30, 1966

3,269,965
COPOLYMERS OF EPOXY FATTY ESTERS AND/OR FATTY ALCOHOLS WITH C₄-C₆ LACTAMS
Robert J. Johnson, Chicago, Ill., assignor to Swift & Company, Chicago, Ill., a corporation of Illinois
No Drawing. Filed Feb. 14, 1962, Ser. No. 173,148
13 Claims. (Cl. 260—18)

This invention relates to new polymers of oxirane-containing higher fatty materials and, more particularly to copolymers of oxirane-containing higher fatty compositions and lactams and, also, to a method for preparing such copolymers.

Although there is reported in the prior art a limited amount of work relating to the production of polymeric compositions from epoxidized fats, the use of epoxidized compositions in the production of polymers is not nearly as well developed as is the case with epoxy resins. Epoxy resins which represent a distinct group of oxirane compositions generally are reaction products of epihalohydrins and phenols and the oxirane groups are on terminal carbons in the polymer. These epoxy resins are prepared from oxirane-containing materials which are quite different, both in chemical composition and physical character, from the oxirane-containing higher fatty materials.

In contrast to the epoxy ether resins, oxirane-containing fatty materials generally are characterized by having epoxy substitution in an internal open-chain portion of the molecule. Epoxy groups so situated are generally not so reactive as the terminal epoxides and the long chain found in oxirane-containing fatty materials appears to further limit reactivity.

An important object of this invention is to provide new polymers of oxirane-containing higher fatty compositions.

Another object of the invention is the provision of polymers of oxirane-containing higher fatty compositions and lactams.

Still another object of the invention is to provide a method for preparing copolymers of oxirane-containing higher fatty derivatives and lactams.

Yet, another object of the invention is to provide cured, hard, copolymers of oxirane-containing higher fatty derivatives and lactams.

Additional objects, if not specifically set forth herein, will be readily apparent to those skilled in the art from the detailed description of the invention which follows.

Generally, the novel polymers of the invention comprise hydroxy-lactam derivatives of epoxidized fatty compositions and polymers thereof. In the formation of the hydroxy-lactam derivatives the oxirane groups of the fatty composition are broken and the fatty chain is linked to the nitrogen of the lactam. This linkage occurs at the carbon in the fatty chain occupied before formation of the copolymer by an epoxy group and the adjacent carbon in the fatty chain is substituted with an hydroxyl group. The polymers thus formed can be employed as binders and in the formulation of coatings. They are also hardenable and in the hardened form can be used as potting and casting resins.

More specifically, the copolymers of the invention comprise liquid and solid copolymers of oxirane-containing higher fatty acids, oxirane-containing higher fatty alcohols, oxirane-containing higher fatty ketones, oxirane-containing higher fatty ethers and derivatives thereof such as the esters, amides, hydrazides, etc. with lactams. The compositions are easily prepared by bringing together the oxirane-containing composition and the lactam and heating until a reaction between the oxirane group of the fatty composition and the lactam is effected. The copolymers thus formed can be characterized as having repeating units of the structure

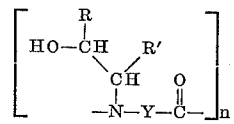

where Y is an alklene group of 3–5 carbons; $n$ is 2–10,000, and R and R' are selected from the group consisting of alkyl, epoxy alkyl, hydroxy alkyl, alkenyl, alkyl ester, epoxy alkyl ester and mixtures thereof.

Suitable lactams utilized in breaking the oxirane ring of the epoxidized composition and forming the copolymers of the invention include those organic ring compounds containing in the ring the

group. Such compositions can be derived from gamma and delta amino carboxylic acids by elimination of water. Thus, gamma lactams such as gamma butyrolactam, delta lactams such as delta valerolactams, delta caprolactam and epsilon lactams such as epsilon caprolactam are representative of lactams having available reactive amino hydrogens and, also, are free of N substituents. Those lactams having 4–6 carbons are preferred.

Oxirane-containing higher fatty compositions which can be employed in the formation of the copolymers include oxirane-substituted higher fatty acids, oxirane-substituted higher fatty alcohols, and derivatives thereof such as esters of the fatty acid or of the alcohol, amides, hydrazides, etc. Also contemplated as the oxirane-containing reactant are oxirane-containing fatty ketones, and oxirane-containing fatty ethers. Generally these materials have in the structure thereof at least one long-chain (10–22 carbon) radical which is substituted one to four times with oxirane-containing groups. Mono-, di-, and trihydric aliphatic alcohol esters of oxirane-containing higher fatty acids are particularly suitable. Glyceride esters of oxirane-containing higher fatty acids are preferred inasmuch as such esters are readily available and can be obtained by epoxidation of naturally-occurring animal, vegetable, and marine triglyceride wherein ethylenic unsaturation in the naturally-occurring material is converted to oxirane groups. Synthetic glycerides such as epoxidized triolein, epoxidized trilinolein, and epoxidized trilinolenin, and mono- and diglycerides of such epoxidized fatty acids can also be used. Partially and completely epoxidized glycerides are considered within the scope of the invention with the more highly epoxidized compositions being particularly useful because of the high functionality of such compositions.

Epoxidized tallow, epoxidized cottonseed oil, epoxidized soybean oil, epoxidized linseed oil, epoxidized menhaden oil, epoxidized sperm oil, and epoxidized sardine oil are a few of the many epoxidized naturally-occurring glycerides which can be used in forming the copolymer. The fatty acids derived from these naturally-occurring glycerides when esterified with lower aliphatic, monohydric, dihydric, trihydric, tetrahydric, and pentahydric alcohols result in compositions which are also a desirable source of the oxirane group. Examples of alcohols which may be esterified with the epoxy fatty acids to form suitable esters include lower glycols, glycerol, erythritol, mannitol, pentaerythritol, and sorbitol. Lower mono and polycarboxylic acid esters of epoxidized higher fatty alcohols such as diepoxy stearoyl acetate di-(9,10-epoxystearoyl) maleate and di-(9,10,12,13-diepoxystearoxyl) adipate typify other suitable oxirane-containing materials.

In the manufacture of the copolymer, the lactam and the oxirane-substituted fatty composition are mixed and heated to a temperature sufficient to cause the components to react. Usually the reaction is carried out at temperatures in the range below about 300° C. and preferably around 50–120° C. Lower temperatures can be employed to carry out the reaction, but inordinately long times are required for completion of the reaction. When the oxirane-containing reactant and the lactam are mixed and heated, the two components become miscible, the reaction starts, and the hydroxy lactam derivative of the fatty composition is formed as an intermediate. Further heating at temperatures in the range of about 80–400° C. results in the opening of the lactam ring and formation of the hardenable copolymer. The reaction may be characterized as follows:

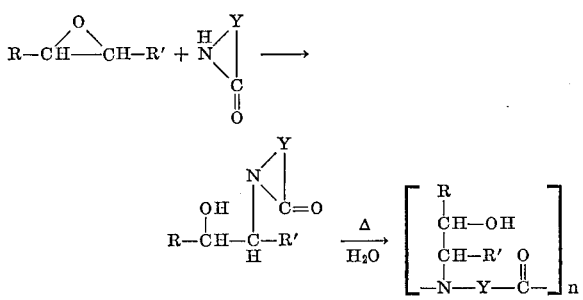

where R and R' are, as indicated previously, selected from the group consisting of alkyl, epoxy alkyl, hydroxy alkyl, alkenyl alkyl ester, epoxy alkyl ester, and mixtures thereof, Y is an alkylene group of 3–5 carbons and $n$ is 2–10,000. A small amount of water usually present in trace amounts in the reactants (around 0.05–1%) is believed to promote polymerization of the hydroxy lactam derivative of the oxirane-substituted fatty composition.

Although very small amounts, as low as about 1% of the lactam, based upon the weight of the oxirane-containing composition are sufficient to produce the polymers from the epoxide, larger amounts of the lactam, around 5–50% are generally preferred if harder copolymers are desired. Larger amounts of the lactam, up to around 90%, based on the weight of the oxirane-containing material can be employed to produce very hard products having good strength. A wide range of properties in the final product can be realized by varying the ratio of the reactants.

In addition, the functionality of the oxirane-substituted composition affects the physical characteristics of the copolymer. High-oxirane materials having a plurality of reactive oxirane groups can be cured to form harder, tougher products than can copolymers having few reactive oxirane groups. Usually it is preferred, if the composition is to be hardened, that the polymer contain reactive oxirane groups. This preferred form of the invention is insured by reacting only enough lactam with the epoxide to take up some, but not all, of the epoxide groups with the amino group of the lactam. If methyl epoxy stearate is reacted with an equimolar amount of lactam, no reactive oxirane groups are present in the product. The reaction between equimolar amounts of the lactam with methyl diepoxy linoleate or methyl triepoxy linolenate results in the production of copolymers having one and two curable epoxide groups, respectively.

Curing of the epoxide-lactam derivative having reactive oxirane groups is effected by contacting the composition with one or more epoxy curing agents and heating the mixture of the polymer and curing agent, if necessary, to obtain a cure. Epoxy curing agents, such as the polycarboxylic acid anhydrides, amines and strong Lewis acids, may be used in hardening the copolymer.

Those anhydrides derived from polycarboxylic acids and containing at least one anhydride group are very satisfactory curing agents. The anhydrides of saturated or unsaturated aliphatic, cycloaliphatic, aromatic or heterocyclic polycarboxylic acids are contemplated. Typical nonlimiting examples of this group of curing agents are phthalic anhydride, isophthalic anhydride, di-, tetra-, and hexahydro phthalic anhydride, succinic anhydride, maleic anhydride, chlorendic anhydride, monochloro maleic anhydride, chlorosuccinic anhydride, pyromellitic anhydride, di-, tetra-, and hexahydro pyromellitic anhydride, and 3,6-dimethyl-4-cyclohexadiene-1,2 - dicarboxylic acid anhydride.

Polyamines can also be employed as the curing agent, either alone or in combination with the aforementioned anhydrides. Aliphatic and aromatic primary, secondary, and tertiary amines can be employed and the amines can be monoamines or polyamines. Primary and secondary aliphatic and aromatic amines having more than one amino group are favored. Alkylene polyamines, such as the diamines, tetramines, triamines, pentamines, and hexamines, are also contemplated as the polyamine reactant. Specific alkylene polyamines include ethylene diamine, trimethylene diamine, pentamethylene diamine, hexamethylene diamine, diethylene triamine, triethylene tetramine, tetraethylene pentamine, and long-chain polyamines such as the N-alkyl alkylene polyamines wherein the alkyl substitution comprises a long-chain alkyl group of 10–22 carbons. Suitable aromatic polyamines include o-phenylene diamine, m-phenylene diamine, o-tolidine, 2,4-tolidine, 2,4-tolylene diamine, 1,4-diamino naphthalene, and other aromatic polyamines free of noninterfering substituents.

Suitable Lewis acids which can be employed in curing the epoxide group include Friedel-Crafts catalysts such as aluminum chloride, aluminum bromide, tin tetrachloride, zinc chloride, boron trifluoride, and boron trifluoride complexes such as the etherate.

An example of the type of structure formed in the reaction of this invention the product resulting from the reaction between epsilon caprolactam and epoxidized oleyl, linoleyl, linolenin can be characterized as follows:

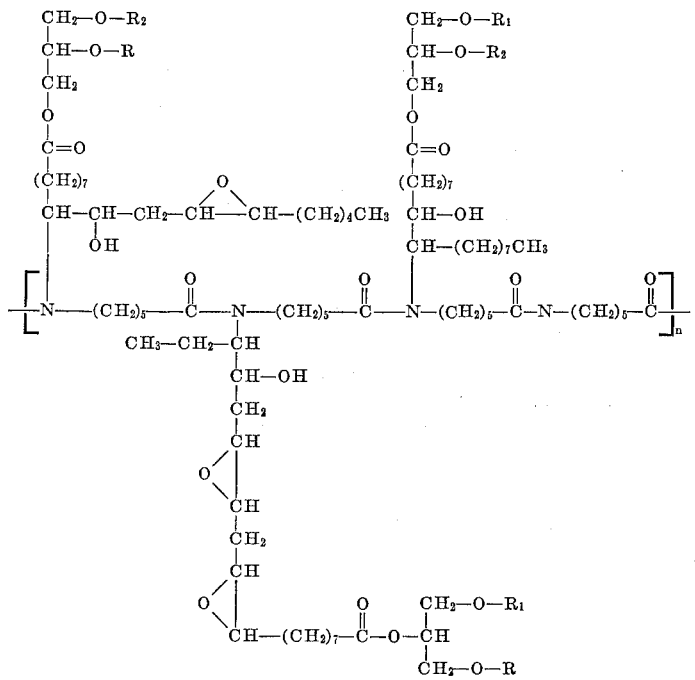

where

R is 9,10-epoxystearoyl,
R₁ is 9,10,12,13 epoxystearoyl, and
R₂ is 9,10,12,13,15,16 triepoxystearoyl.

The following examples illustrate specific embodiments of the invention, employing diverse reactants and also illustrating the products formed.

*Example I*

This example illustrates the preparation of the copolymer and the hardening of the copolymer by curing the oxirane groups in two steps. A mixture of 942 grams epoxidized soybean oil (oxirane oxygen 7.0%) and 450 grams of epsilon caprolactam was formed and the mixture was heated to a temperature of 200° C. while agitating for a period of 1 hour. The temperature was then reduced to 120° C. and 148 grams of m-phenylene diamine was added. The mixture was held at around 120° C. for 2 hours and then cooled to room temperature. The product which was formed was a strong, flexible polymer suitable for the preparation of gaskets for chemical processing equipment.

*Example II*

A one-step method for producing the cured copolymer is illustrated in this example. A mixture of 1200 grams epoxidized linseed oil (oxirane oxygen content 9.0%), 48 grams epsilon caprolactam and 296 grams triethylene tetramine was placed in a 2-liter flask and the reactants were vigorously mixed. The flask was then connected to a water aspirator and a vacuum was drawn on the flask while the mixture was heated in a boiling water bath for 120 minutes. The product was a flexible, elastic polymer suitable for the manufacture of structural adhesives.

*Example III*

A mixture of 600 grams epoxidized linseed oil (oxirane oxygen content 9.7%) and 24 grams epsilon caprolactam was placed in a 1,000-milliliter Erlenmeyer flask and the mixture was heated to 70° C. until the reactants were miscible. At this point, 144 grams m-phenylene diamine was added and the flask was evacuated with a water aspirator. The stirred mixture was then heated in a boiling water bath for 2 hours, followed by cooling to room temperature. The resin product was cast in the form of a bar ½ inch x ½ inch x 5 inches in dimension. The bar was cured by heating at 248° F. for 16 hours followed by four 2-hour heating periods at 400° F., 450° F., 500° F., and 537° F. The bar was tested in accordance with ASTM test D–648 to measure heat distortion. It was found that the heat distortion temperature is greater than 400° F., which is the limit of the apparatus. A similar product prepared in the same manner with the exception that the caprolactam was omitted results in the production of a bar having a heat distortion temperature of only 295° F.

*Example IV*

A mixture of 364 grams of epoxidized linseed oil (oxirane content 9.1%), 14.6 grams epsilon caprolactam was formed and heated at 70° C. until the caprolactam and epoxidized oil were miscible. At this point, 29.2 grams of triethylene tetramine was added. The flask was evacuated with a water aspirator and heated in a boiling water bath for 1 hour while maintaining the vacuum. The flask was then cooled to room temperature while still under vacuum and 40 grams of this product was mixed with 4.8 grams of the product resulting from the reaction between 146.2 grams of triethylene tetramine and 50 grams gaseous anhydrous hydrogen bromide. An additional 6 grams of triethylene tetramine was added and the mixture was placed in an oven at 69° C. The mixture was contained in a glass jar equipped with a thermocouple. While the mixture was cloudy at room temperature, it became clear as the temperature reached 82° C. The temperature increase resulted from the exothermic nature of the reaction, and the temperature rose to 102° C. after about 30 minutes in the oven. The product was a crystal clear, slightly yellow, tough, resilient polymer suitable for use in the preparation of potting or encapsulating compositions.

*Example V*

Mix together 1110 grams of methyl 9, 10 epoxystearate and 44.5 grams of alpha-gamma butyrolactam. Heat in a boiling water bath for 2 hours while agitating. Cool to 60° C. Add while stirring 11.1 grams of triamylamine. Then add while stirring 50.0 grams of maleic anhydride. Maintain temperature at 60° C. and continue stirring for 30 minutes. Pour into a Teflon mold containing electronic parts which are to be protected by encapsulation. Place the covered mold in an oven at 180° C. and bake overnight. Cool to room temperature and remove from the mold. The resulting encapsulated electronic components are then adequately protected for installation in such applications as guided missiles, satellites, etc.

*Example VI*

Weigh into a 2-liter, round bottomed flask equipped with a stirrer, thermometer and condenser:

| | Grams |
|---|---|
| Epoxidized lard oil (oxirane oxygen=3.9%) | 2400 |
| Caprolactam | 96 |
| Triethylene tetramine | 12.8 |

Evacuate the flask with bench vacuum and heat at 105° C.±2° C. for 120 minutes, turn off vacuum, add while stirring 141 grams triethylene tetramine, mix until uniform. Add 2400 grams glass fibers (approximately ¼ inch long), mix until uniform. The resulting compound may be used as a caulking compound to repair fiberglass boats. (The repaired area should be baked with an infrared lamp until the surface is tack free.)

*Example VII*

Mix together until uniform 600 grams epoxidized linolenyl alcohol, 200 grams caprolactam+2.0 grams water. Heat at 250° C. for 12 hours. Cool to room temperature, add while stirring 1800 grams dimethyl sulfoxide. Mix until uniform. The resulting solution was then applied as a coating with a wet thickness of approximately 5 mils on the inside surface of metal drums for chemical use. The resultant coating was then exposed to circulating air until the evaporation of the dimethyl sulfoxide was substantially complete. The coating was then exposed to anhydrous boron trifluoride gas for a period of one hour. This produced a tough, hard coating with exceptional chemical resistance.

The use of vacuum as in the examples during the reaction is designed to exclude oxygen from the reaction. Although freedom from oxygen is not an essential condition it does insure that a lighter colored product will be produced. Inert gases such as nitrogen can also be used to sweep air from the reaction vessel and the reaction may then be carried out under a blanket of inert gas.

The copolymer composition can be combined with a variety of improving agents such as plasticizers, coloring materials, fillers, reinforcing agents, etc. Plasticizers such as the amino polyamides (Versamids), polysulfide rubbers (Thiokols) can be employed to improve the flexibility of the product. In addition, inert materials such as glass fibers can be incorporated in the polymers to reinforce the product.

Obviously many modifications and variations of the invention as hereinbefore set forth may be made without departing from the spirit and scope thereof and, therefore, only those limitations should be imposed as are indicated in the appended claims.

What is claimed is:

1. A method for preparing hardenable copolymers of oxirane substituted higher fatty compositions selected from the group consisting of esters of epoxy fatty acids and epoxy fatty alcohols and mixtures thereof comprising: heating and reacting said compositions with a lactam having about 4–6 carbons to a temperature of about 50–400° C. for a time sufficient to form a copolymer of said reactants.

2. The method of claim 1 wherein the oxirane substituted fatty composition is an ester of an oxirane substituted higher fatty acid of 10–22 carbons.

3. The method of claim 1 wherein the oxirane substituted higher fatty composition is a glyceride ester of oxirane substituted higher fatty acids.

4. The method of claim 1 wherein the oxirane substituted higher fatty composition is an epoxidized animal fat.

5. The method of claim 1 wherein the oxirane substituted higher fatty composition is an epoxidized vegetable oil.

6. A copolymer of an oxirane substituted ester of higher fatty acid of 10–22 carbons and a lactam of 4–6 carbons.

7. The copolymer of an oxirane substituted higher fatty composition selected from the group consisting of esters of epoxy fatty acids and epoxy fatty alcohols and mixtures thereof, and lactams of 4–6 carbons.

8. The copolymer of claim 7 wherein said copolymer has residual reactive oxirane groups.

9. The copolymer of claim 7 wherein substantially all of the oxirane groups are reacted to form a cured copolymer.

10. A copolymer of a glyceride ester of oxirane substituted higher fatty acids of 10–22 carbons and a lactam of 4–6 carbons.

11. The composition of claim 10 wherein the oxirane substituted glyceride ester is an epoxidized animal fat.

12. The composition of claim 10 wherein the oxirane substituted glyceride ester is an epoxidized vegetable oil.

13. A method for preparing a hard resinous composition comprising: forming a mixture of an oxirane substituted higher fatty composition selected from the group consisting of esters of epoxy fatty acids and epoxy fatty alcohols and mixtures thereof and an amount of a lactam of 4–6 carbons sufficient to react with some, but not all of the epoxide groups of said oxirane substituted fatty compositions, at a temperature of about 50–400° C. to form a copolymer and further reacting said copolymer with an epoxy curing agent.

References Cited by the Examiner

UNITED STATES PATENTS

| 2,847,342 | 8/1958 | Kohn | 260—47 |
| 2,847,343 | 8/1958 | Kohn | 260—47 |
| 2,928,795 | 3/1960 | Tinsley | 260—18 XR |

LEON J. BERCOVITZ, *Primary Examiner.*

C. W. IVY, T. D. KERWIN, *Assistant Examiners.*